United States Patent [19]

Sudo

[11] Patent Number: 5,003,385
[45] Date of Patent: Mar. 26, 1991

[54] STEREOSCOPIC TELEVISION SYSTEM
[75] Inventor: Hajime Sudo, Matsudo, Japan
[73] Assignee: Kabushiki Kaisha Toshiba, Kawasaki, Japan
[21] Appl. No.: 397,958
[22] Filed: Aug. 23, 1989
[30] Foreign Application Priority Data Aug. 24, 1988 [JP] Japan .............................. 63-208242
Aug. 24, 1988 [JP] Japan .............................. 63-208245

[51] Int. Cl.[5] ..................... H04N 13/00; H04N 15/00
[52] U.S. Cl. ....................................... 358/88; 358/92; 358/3; 350/132
[58] Field of Search ....................... 358/88, 92, 89, 91, 358/108, 3; 350/132, 352

[56] References Cited

U.S. PATENT DOCUMENTS

| 4,295,153 | 10/1981 | Gibson | 358/3 |
| 4,480,893 | 11/1984 | Fantone | 350/132 |
| 4,647,966 | 3/1987 | Phillips et al. | 358/92 |
| 4,751,570 | 6/1988 | Robinson | 358/88 |

FOREIGN PATENT DOCUMENTS

| 0291286 | 12/1987 | Japan . | |
| 0291292 | 12/1987 | Japan . | |
| 0007094 | 1/1988 | Japan . | |
| 0316845 | 12/1988 | Japan | 358/88 |
| 0054438 | 3/1989 | Japan | 358/88 |

OTHER PUBLICATIONS

Sutro et al., "Robot Vision: V. Stereo TV Cameras," Proceedings of the First National Conference, Sep. 13-15, 1972, California Institute of Technology, pp. 275, 277.
"Stereo TV Camera," Product Catalogue, Tokyo Electronic Industry Co., Ltd., 1986, p. 12.

Primary Examiner—John K. Peng
Attorney, Agent, or Firm—Foley & Lardner, Schwartz, Jeffery, Schwaab, Mack, Blumenthal & Evans

[57] ABSTRACT

A stereoscopic television system has first and second openings through which light rays reflected from an object to be viewed enter. The system includes a first polarizer polarizing the light rays passing through the first opening and a second polarizer polarizing light rays passing through the second opening. The polarization planes of the first and second polarizers are different from each other. Optics are provided for aligning the center axes of the light rays passing through the first and second openings to generate aligned light rays. A polarizer switch receives the aligned light rays and selectively and alternately passes light rays polarized by one of the first and second polarizers. A zoom lens is provided for optically treating the aligned light rays for zoom operation. A video camera converts optical images of the light rays passing through the polarizer switch and the zoom lens into electrical signals corresponding to the light rays passing through the first and second openings. A television system then displays an image of the object, based on the electrical signals.

3 Claims, 6 Drawing Sheets

STEREOSCOPIC TELEVISION SYSTEM

BACKGROUND OF THE INVENTION

1. Field of the Invention

The present invention relates to a stereoscopic television system that can prevent optical axes of a plurality of camera units disposed in the television system from deviating from their correct paths and thus provide proper sense of stereoscopic images of an object.

2. Description of the Prior Art

Some work sites such as deep sea and space are not accessible by workers, or some work sites such as nuclear reactors may risk the safety of workers. To work under a hazardous environment at such inaccessible sites, a manipulator is useful. The manipulator is sent to such a site and remotely controlled by operators who are positioned at a safe place far from the work site.

According to this sort of technique, the image of work site (work environment) is taken by camera units, and images of the work site are stereoscopically displayed on a display unit such as a monitor television unit. Viewing the images on the display unit, the operators remotely control the manipulator.

FIG. 1 is a view showing a conventional stereoscopic television system for providing stereoscopic images of a work site for the purpose of remote control.

The stereoscopic television system of FIG. 1 comprises a right camera unit 101a, a left camera unit 101b, an image mixer 102, a frame converter 103, a shutter-spectacles driver 104, shutter-spectacles 105, and a monitor television unit 106. The two camera units 101a and 101b are horizontally arranged side by side on a universal head (not shown) to simultaneously photograph a front object 107. The camera units 101a and 101b are provided with optical systems 101c and 101d, respectively. Each optical system generally comprises a zoom lens.

Light from the object 107 passes through the optical systems 101c and 101d to form images on image pickup elements (not shown ) of the camera units 101a and 101b. Then, the image pickup elements send video signals to the image mixer 102, from which the video signals are alternately outputted at predetermined intervals to the frame converter 103. The frame converter 103 carries out a flickerless process on the video signals to remove flicker from images. Then, the video signals are alternately provided for the monitor television unit 106.

A viewer 108 senses stereoscopic images from the images displayed on the monitor television unit 106 through the shutter spectacles 105 whose left and right spectacles are alternately opened and closed according to synchronous signals provided by the frame converter 103. Namely, the stereoscopic television system of this arrangement utilizes afterimages of human eyes to provide the sense of stereoscopic images.

When the viewer 108 wants to have an image of a wide-view angle or a tele-view-angle through the zoom lenses of the optical systems 101c and 101d, the viewer 108 may operate a lens controller 109. If the operator wants to adjust a distance between the camera units 101a and 101b or a viewing angle of the object 107, the viewer 108 may operate a universal head controller 110.

To let the viewer 108 sense stereoscopic images from the stereoscopic television system of such an arrangement, it is necessary to align the images projected on the left and right eyes of the viewer 108 with each other in the magnifications, positions, postures, etc., of the images. To do so, optical axes of the optical systems 101c and 101d extending to the image pickup elements (not shown) shall be set in a plane that includes the camera units 101a and 101b.

When the optical systems 101c and 101d comprise zoom lenses, optical axes of the zoom lenses shall be stationary even if their zooming magnifications are changed. To realize this, the lenses shall be carefully selected and precisely positioned. In practice however, it is very difficult to prepare lenses of equal properties and to strictly maintain their setting positions under external influences.

Namely, if the conventional stereoscopic television system employs zoom lenses for its optical systems 101c and 101d, optical axes of the lenses tend to deviate from their correct paths. Particularly when the zoom lenses are operated to zooming positions, the optical axes may greatly deviate from their correct paths. Then, images projected on the left and right eyes of the viewer 108 will not align with each other, and the viewer cannot correctly sense stereoscopic images.

When the stereoscopic television system is used in hazardous environment to remotely control a manipulator and if the system causes such deviations on its optical axes, the observer cannot conceive good stereoscopic images of an object to be handled by the manipulator. This will deteriorate the safety of work and the operability of the manipulator.

As described before, the conventional stereoscopic television system comprises a plurality of the camera units 101a and 101b provided with the optical systems 101c and 101d. To align optical axes of the optical systems with their proper paths, the optical systems use lenses of equal properties and the lenses must be precisely assembled in the optical systems 101c and 101d. When the lenses are zoom lenses, optical axes of the optical systems 101c and 101d tend to deviate from the proper paths in taking zooming positions. In this case, proper stereoscopic images are not provided.

SUMMARY OF THE INVENTION

To solve the above-mentioned problems an object of the present invention is to provide a stereoscopic television system comprising a plurality of camera units for providing stereoscopic images, which can prevent optical axes of optical systems of the camera units from deviating from their correct paths, thus preventing the images from deviating from each other and providing proper stereoscopic images.

According to an aspect of the invention, a stereoscopic television system comprises a plurality of camera units each having an optical system and an image pickup element. Images of an object are photographed by the camera units and displayed. The images are processed with a stereoscopic image processor to provide stereoscopic images to a viewer.

Each of the camera units further comprises a first beam splitter disposed between the optical system and the image pickup element, a second beam splitter disposed on the object side of the optical system, a light source for emitting a reference beam to the first beam splitter, and a light receiving element. The reference beam emitted from the light source is reflected by the first beam splitter, passed through the optical system, reflected by the second beam splitter, and received by the light receiving element.

The stereoscopic television system further comprises an arithmetic unit for adjusting an optical axis deviation of each optical system according to the reference beam received by the light receiving element, and a correcting unit for correcting the deviation of the optical system according to the information provided by the arithmetic unit.

Namely, the reference beam emitted from the light source is reflected by the first beam splitter located on the image pickup element side, passed through the optical system, reflected by the second beam splitter located on the object side, and guided to the light receiving element. If the optical axis of the optical system deviates from its correct path, the reference beam is affected by the deviation, and, therefore, an incidental position of the reference beam on a light receiving face of the light receiving element deviates from a normal incidental position. The deviation of the incidental position of the reference beam is operated, and, based on a result of the operation, the deviation of the optical axis of the optical system is corrected.

According to another aspect of the invention, a stereoscopic television system alternately displays right and left input images and processes the images to provide stereoscopic images to a viewer. The system comprises a first polarizing unit for polarizing right image light to form first-type polarized light, a second polarization unit for polarizing left image light to form second-type polarized light, structure for putting the first-type and second-type polarized light on a common optical axis and supplying the light to a single optical system, a polarization switching unit for alternately passing the first-type polarized light and second-type polarized light with the common optical axis, a display for displaying images based on the polarized light, and a processor for processing the images to provide stereoscopic images.

These and other objects, features and advantages of the present invention will be more apparent from the following detailed description of preferred embodiments in conjunction with the accompanying drawings.

DETAILED DESCRIPTION OF THE PREFERRED EMBODIMENTS

Figure 1:
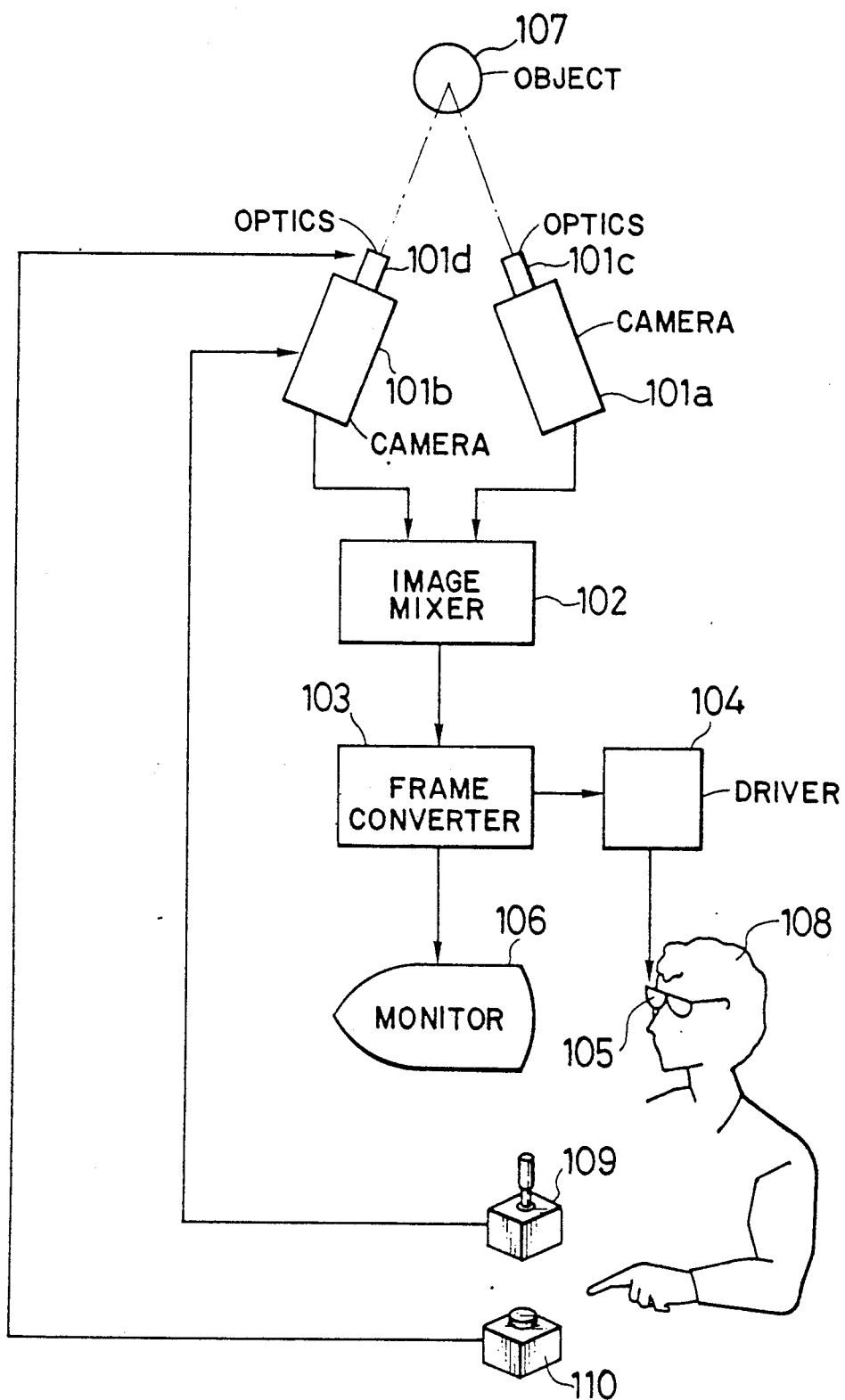
FIG. 1 is a schematic view showing a prior art stereoscopic television system.
Figure 2:
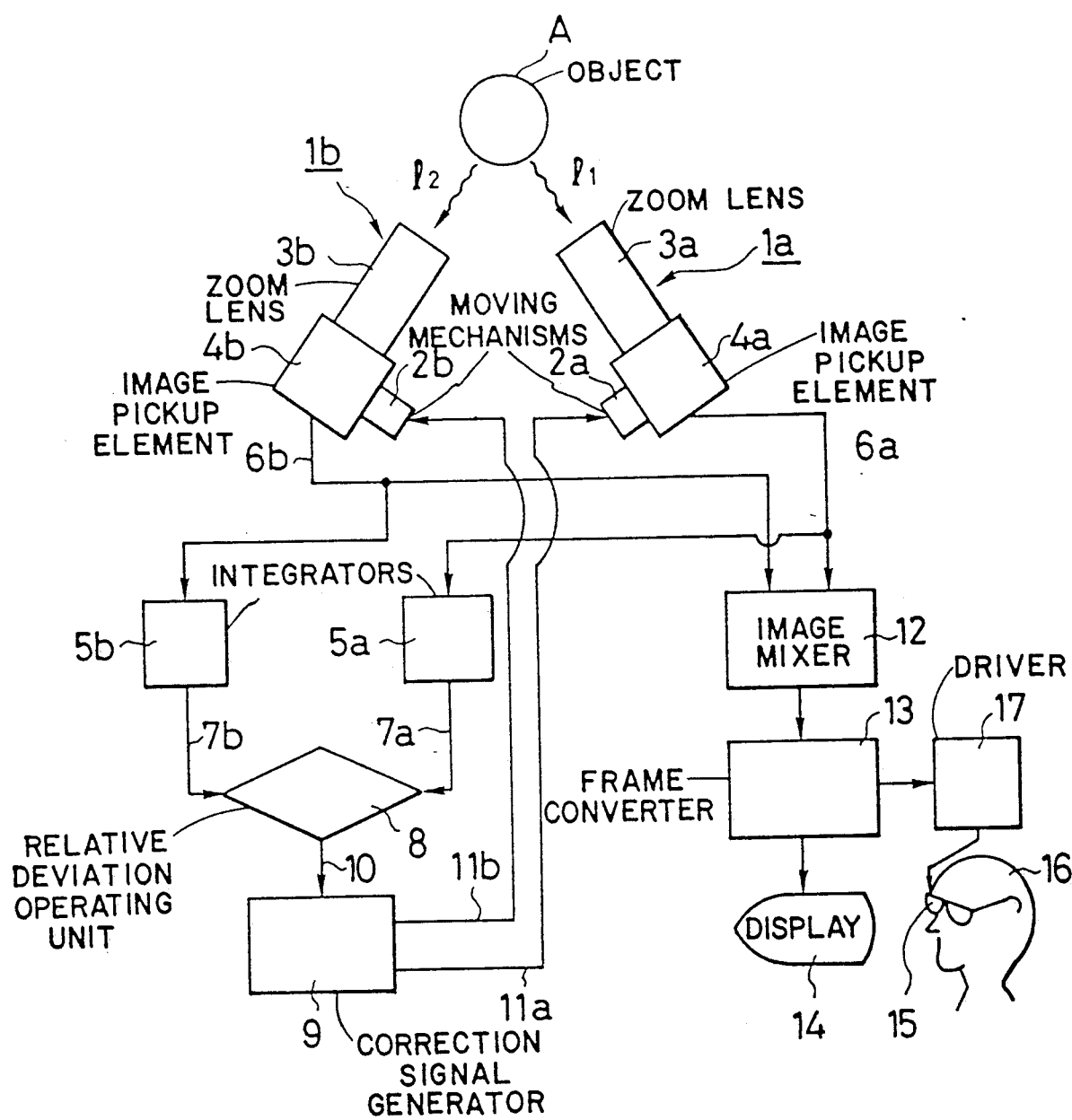
FIG. 2 is a schematic view showing a stereoscopic television system according to a first embodiment of the present invention.

FIG. 2 is a schematic view showing a stereoscopic television system according to the first embodiment of the invention. Two camera units 1a and 1b corresponding to right and left views, respectively, are horizontally arranged side by side on a universal head (not shown). The camera units 1a and 1b are spaced a predetermined distance to photograph an object A.

The camera units 1a and 1b are moved horizontally and vertically by means of moving mechanisms 2a and 2b, respectively. The moving mechanisms 2a and 2b are disposed on the universal head (not shown) and each comprises an actuator such as a piezoelectric element.

The camera units 1a and 1b further comprises optical systems, respectively. The optical systems comprise zoom lenses 3a and 3b and image pickup elements 4a and 4b, respectively. The image pickup elements 4a and 4b may be CCDs, etc.

Image information integrators 5a and 5b receive image signals 6a and 6b from the image pickup elements 4a and 4b, and integrate horizontal brightness (quantities of light) of the images of the object A to compress the information. Namely, the integrators 5a and 5b convert a two-dimensional distribution of light quantities into a one-dimensional vertical distribution of the light quantities.

A relative deviation operating unit 8 correlatively compares image information signals 7a and 7b outputted from the image information integrators 5a and 5b with each other to numerically operate the vertical deviations of the right and left images photographed by the camera units 1a and 1b to quantitatively detect the deviations of the images.

Namely, if the zoom lenses 3a and 3b of the camera units 1a and 1b cause their optical axes to deviate from their proper paths, or if zooming operations of the lenses 3a and 3b cause their magnifications to deviate from correct magnifications, the image signals 6a and 6b from the image pickup elements 4a and 4b may be affected by the deviation and then received by the image information integrators 5a and 5b. Therefore, a result of operation carried out in the relative deviation operating unit 8 corresponds to the optical axis deviation or magnification deviation of the zoom lenses 3a and 3b.

In this way, the image information integrators 5a and 5b and relative deviation operating unit 8 constitute a detecting means for detecting the deviations of images taken by the camera units 1a and 1b.

The relative deviation operating unit 8 outputs a relative deviation signal 10 to a correction signal generator 9, which provides correction signals 11a and 11b for correcting the deviation of the images photographed by the camera units 1a and 1b. The correction signals 11a and 11b are provided for the moving mechanisms 2a and 2b of the camera units 1a and 1b to correct the deviation of the right and left images.

In this way, the correction signal generator 9 and moving mechanisms 2a and 2b constitute correcting means for correcting the deviation of images photographed by the camera units 1a and 1b.

The integrators 5a and 5b, relative deviation operating unit 8 and correction signal generator 9 may be constituted by a single microcomputer that realizes the above-mentioned functions, or they may be realized by exclusive-use circuits, respectively.

An image mixer 12 receives the right and left image signals 6a and 6b from the image pickup elements 4a and 4b, and alternately provides the signals at predetermined intervals to a frame converter 13, from which the signals are given to a display unit 14 such as a monitor television unit. The frame converter 13 carries out a flickerless process on the image signals 6a and 6b to give flickerless images to the observer.

Shutter spectacles 15 are put on the eyes of a viewer 16. The spectacles 15 receive synchronous signals from the frame converter 13. A spectacles driver 17 optically and electrically opens and closes right and left eyes of the shutter spectacles alternately. With the shutter spectacles 15, the viewer 16 can sense images on the display unit 14 as stereoscopic images.

Operation of the stereoscopic television system according to the first embodiment of the invention will now be explained.

The camera units 1a and 1b are set against the object A. Outside light $1_1$ and $1_2$ from the object A are passed through the zoom lenses 3a and 3b to form images on the image pickup elements 4a and 4b, respectively. The image pickup elements 4a and 4b provide image signals 6a and 6b of the object A to the display unit 14 alternately at predetermined intervals (for example, every 1/60 seconds) via the image mixer 12 and frame converter 13. Then, the viewer 16 observes images that are alternately displayed on the display unit 14 through the shutter spectacles 15 as stereoscopic images of the object A.

If optical axes are oriented correctly and zooming magnifications in the zoom lenses 3a and 3b are correct, it will be determined that there is no deviation in the images photographed by the right and left camera units 1a and 1b. This determination is formed according to a result of operation carried out in the relative deviation connecting unit 8. Therefore, the moving mechanisms 2a and 2b for correcting deviations of the images photographed by the camera units 1a and 1b are not driven.

When a lens controller (not shown) is operated during the photographing operation of the camera units 1a and 1b to change the zoom lenses 3a and 3b from wide angle positions to zooming positions, or when a universal head controller (not shown) is operated to change an observing direction, a deviation may occur in, for example, an optical axis of the zoom lens 3a of the camera unit 1a.

If such a deviation occurs, the image signals 6a and 6b from the image pickup elements 4a and 4b are inputted to the image information integrators 5a and 5b. The image information integrators 5a and 5b convert the image signals 6 and 6b to form a one-dimensional vertical distribution of light quantities, and provides resultant image information signals 7a and 7b to the relative deviation operating unit 8.

The relative deviation operating unit 8 correlatively compares the image information signals 7a and 7b with each other to numerically operate a vertical deviation of the images photographed by the camera units 1a and 1b. Namely, the unit 8 detects a relative deviation of the right and left images photographed by the camera units 1a and 1b, i.e., a relative vertical deviation of the optical axes of the zoom lenses 3a and 3b. Then, the relative deviation operating unit 8 provides the relative deviation signal 10 to the correction signal generator 9.

According to the relative deviation signal 10, the correction signal generator 9 outputs the correction signals 11a and 11b to the moving mechanisms 2a and 2b of the camera units 1a and 1b.

The moving mechanism 2a is driven according to the correction signal 11a to correct the deviation of the optical axis of the zoom lens 3a that moves integrally with the camera unit 1a. Then, the relative deviation operating unit 8 judges that an image photographed by the camera unit 1b has no deviation, i.e., there is no deviation in the optical axis of the zoom lens 3b. Therefore, the correction signal generator 9 provides a correction signal of zero correction to the moving mechanism 2b, which is therefore not driven.

In this way, even if the optical axes of the zoom lenses 3a and 3b deviate from their proper paths to deviate images from their correct positions during the photographing operation of the camera units 1a and 1b, the deviation of the optical axes can automatically be corrected so that the viewer 16 can always sense proper stereoscopic images.

When the stereoscopic television system of the invention is used for remotely controlling a manipulator placed in extreme environment, deviations of the optical axes of the zoom lenses 3a and 3b of the camera units 1a and 1b, if any, are automatically corrected. Therefore, a viewer of the system can always sense proper stereoscopic images of an object to improve the safety of work and the operability of the manipulator.

In addition, the image information integrators 5a and 5b and relative deviation operating unit 8 for detecting deviations of images photographed by the camera units 1a and 1b affected by environmental conditions under which the camera units 1a and 1b are placed. Therefore, weather resistance against the critical conditions can be secured with no deterioration of the quality of images and with no complication and specialization of the camera units 1a and 1b.

In the first embodiment, pieces of image information inputted by the camera units 1a and 1b are converted by the image information integrators 5a and 5b into a one-dimensional distribution of light quantities of only one direction, i.e., vertical direction to correlatively compare the quantities with each other. However, the pieces of input image information may one-dimensionally and spatially be integrated in vertical, horizontal and oblique directions, By this, the rotations or horizontal deviations of images may quickly and accurately be corrected.

According to the embodiment, the correlational comparison is done according to the converted one-dimensional distribution of quantities of light. Alternatively, pieces of image information may be correlatively compared with each other according to color tone. Further, the pieces of image information may be correlatively compared with each other according to the distribution of light quantities and the distribution of color tones.

In the embodiment, the relative deviation operating unit 8 has calculated a deviation of the image by correlatively comparing pieces of one-dimensionally compressed image information with each other. The image deviation may be calculated according to mean error quantities of the pieces of one-dimensionally compressed image information.

Although the embodiment has been explained for the case in which the optical axis of the zoom lens 3a of the camera unit 1a has deviated from its correct path, deviations of the optical axes of both the zoom lenses 3a and 3b may be corrected in a similar manner. Even if one or both of the camera units 1a and 1b are subjected to shocks to cause deviations of images from their correct positions, the deviations can easily be corrected.

The embodiment has employed zoom lenses as optical systems. It is possible to employ single-focus lenses as the optical systems.

To correct deviations of the optical axes of the zoom lenses 3a and 3b in the first embodiment, the correction signal generator 9 outputs the correction signals 11a and 11b to drive the moving mechanisms 2a and 2b to mechanically correct the deviations of the optical axes. Alternatively, is possible to correct the deviations of the optical axes by electrically moving images displayed on the display unit 14.

Figure 3:
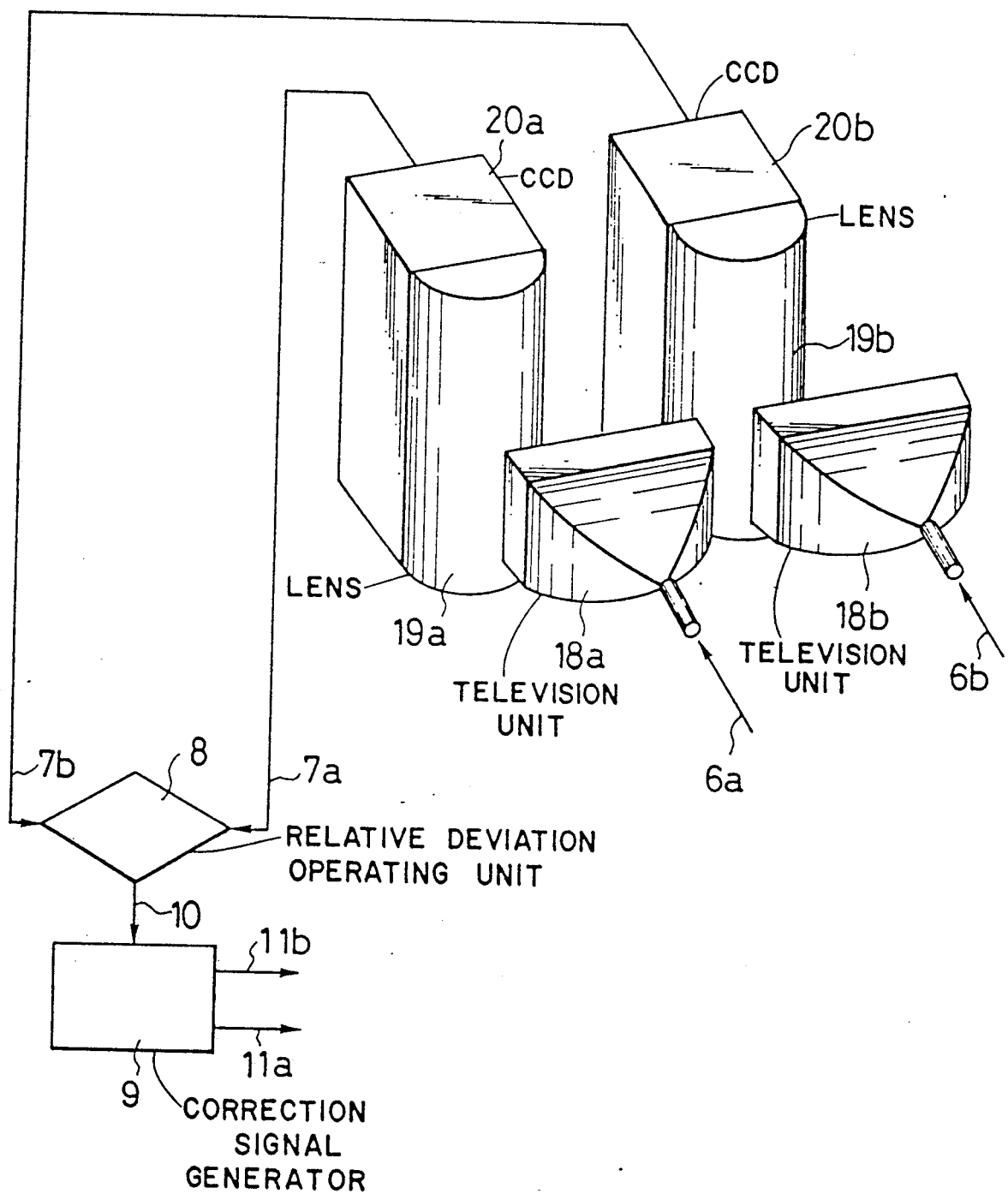
FIG. 3 is a schematic view showing an essential part of a modification of the embodiment shown in FIG. 2.

FIG. 3 is a schematic view showing an essential part of a stereoscopic television system according to a modification of the first embodiment. According to the modification, image pickup elements 4a and 4b provide image signals 6a and 6b to small monitor television units 18a and 18b such as electronic view finders, etc., to display right and left images photographed by camera units 1a and 1b on the monitor units 18a and 18b, respectively. The two images are one-dimensionally integrated by two cylindrical lenses 19a and 19b to form images on linear CCDs 20a and 20b, respectively.

Accordingly to the modification, the cylindrical lenses 19a and 19b convert images photographed by the camera units 1a and 1b into one-dimensional vertical distributions of light quantities to provide image information signals 7a and 7b to a relative deviation operating unit 8. Other arrangements of the modification are the same as those of the first embodiment.

To provide one-dimensional images in plural directions by this modification, a plurality of cylindrical lenses may be arranged vertically, horizontally and obliquely.

Although the modification has employed cylindrical lenses to optically and one-dimensionally integrate images, spherical lenses may be employed instead of the cylindrical lenses to realize two-dimensional optical integration. In this case, images are converted into distribution patterns of light spots.

The first embodiment and its modification explained in the above have spatially integrated pieces of image information inputted from the camera units 1a and 1b and correlatively compared them with each other. It is possible to employ high-speed operational elements to correlatively compare all pixels of image information inputted from the camera units 1a and 1b with each other.

As described in the above in detail, according to the first embodiment of the invention, deviations of images photographed by camera units that may be caused by deviations of optical axes of optical systems of the camera units can automatically be corrected. Therefore, a display unit can provide good images from which a viewer can always sense proper stereoscopic images.

Figure 4:
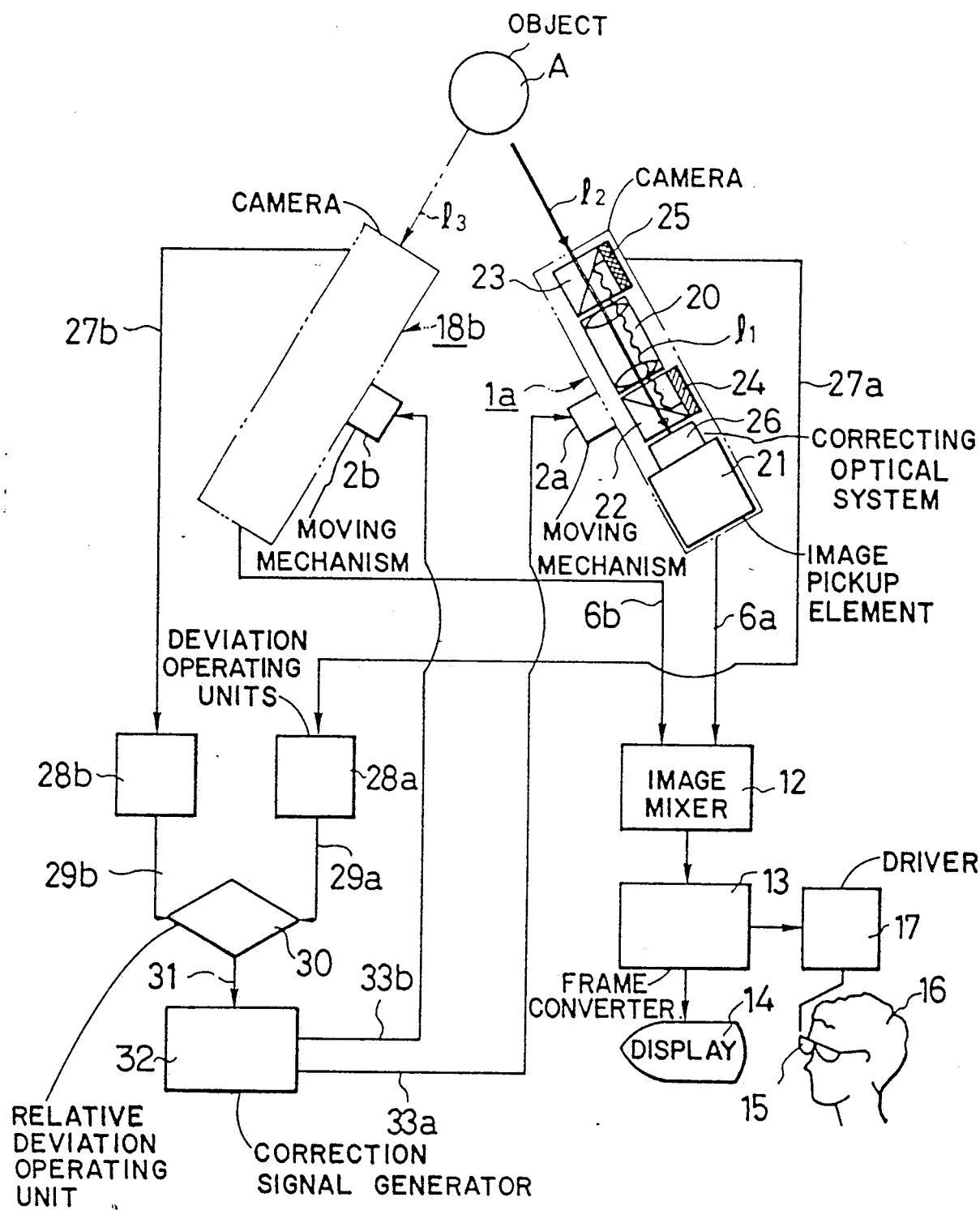
FIG. 4 is a schematic view showing a stereoscopic television system according to a second embodiment of the invention.

FIG. 4 shows a stereoscopic television system according to the second embodiment of the invention.

In FIG. 4, two camera units 18a and 18b are horizontally arranged side by side with a predetermined space between them on a universal head (not shown) to photograph an object A from the right-hand side and from the left-hand side. The camera units 18a and 18b are horizontally and vertically moved by moving mechanisms 2a and 2b, respectively. The moving mechanisms 2a and 2b are disposed on the universal head (not shown) and comprises actuators such as piezoelectric elements, respectively.

Each of the camera units 18a and 18b comprises an optical system, i.e., a zoom lens 20, an image pickup element 21 such as a CCD, a first beam splitter 22 disposed between the optical system 20 and the image pickup element 21, a second beam splitter 23 disposed on the object A side of the zoom lens 20, a light source fitted to the side face of the first beam splitter 22, a light receiving element 25 fitted to the side face of the second beam splitter 23, and an optical path correcting optical system 26 disposed between the image pickup element 21 and the first beam splitter 22 to correct the total length of an optical path of the beam splitter 22.

Each of the first and second beam splitters 22 and 23 comprises a half mirror. The light source 24 is a spot light source for emitting a light beam such as a laser light beam. The light receiving element 25 comprises a PSD (Position Sensing Device) such as a CCD that can read coordinates of a received light beam.

A reference beam (for example, a laser beam) $1_1$ emitted from the light source 24 is reflected by the first beam splitter 22, passed through the zoom lens 20, reflected by the second beam splitter 23, and made incident to the light receiving element 25. Here, the reference beam $1_1$ from the light source 24 is read for its coordinates by the light receiving element 25.

If an optical axis of the zoom lens 20 of any of the camera units 18a and 18b deviates from its correct path, the reference beam $1_1$ advancing toward the second beam splitter 23 is affected by the deviation. Accordingly, an incidental position of the reference beam $1_1$ on the light receiving face of the light receiving element 25 is changed according to the deviation of the optical axis of the zoom lens 20. From coordinates of the incidental position of the reference beam $1_1$ on the light receiving element 25, the deviation and direction of the optical axis of the zoom lens 20 can be detected.

Optical axis deviation operating units 28a and 28b receive detective signals 27a and 27b outputted from the light receiving elements 25 to generate deviations from previously stored reference positions (positions where no deviation is observed on the optical axis of each zoom lens 20) and provide deviation signals 29a and 29b to a relative deviation operating unit 30.

Based on the deviation signals 29a and 29b outputted from the optical axis deviation operating units 28a and 28b, the relative deviation operating unit 30 generates a relative deviation of the optical axes of the zoom lenses 20 of the camera units 18a and 18b to provide a relative deviation signal 31 to a correction signal generator 32.

In this way, the optical axis deviation operating units 28a and 28b and relative deviation operating unit 30 constitute arithmetic means for operating optical axis deviations of the zoom lenses 20.

The correction signal generator 32 receives the relative deviation signal 31 outputted from the relative deviation operating unit 30 and provides correction signals 33a and 33b for correcting the deviations of the optical axes of the zoom lenses 20, to the moving mechanisms 2a and 2b of the camera units 18a and 18b, thus correcting the deviations of the optical axes of the zoom lenses 20.

In this way, the correction signal generator 32 and moving mechanisms 2a and 2b constitute correcting means for correcting the deviations of the optical axes of the zoom lenses 20.

The optical axis deviation operating units 28a and 28b, relative deviation operating unit 30 and correction signal generator 32 may be formed by a single microcomputer to realize the above-mentioned functions, or they may be realized by exclusive-use circuits, respectively.

An image mixer 12 receives image signals 6a and 6b from the image pickup elements 21 to alternately output them at predetermined intervals to a frame converter 13, from which the signals are sent to a display unit 14 such as a monitor television unit. The frame converter 13 performs a flickerless process to remove flicker from images.

Shutter spectacles 15 are put on the eyes of a viewer 16. According to synchronous signals sent from the frame converter 13, a spectacles driver 17 electrically opens and closes the left and right spectacles 15 alternately. With the spectacles 15, the viewer 16 can sense images on the display unit 14 as stereoscopic images.

Operation of the stereoscopic television system of the second embodiment of the invention will now be explained.

The camera units 18a and 18b are set to face the object A. Outside light beams $l_2$ and $l_3$ from the object A are each passed through the second beam splitter 23, zoom lens 20, first beam splitter 22 and optical path correcting optical system 26 to form an image on the image pickup element 21. The image pickup element 21 provides an image signal 6a (6b) of the photographed object A.

The image signals 6a and 6b are passed through the image mixer 12 and the frame converter 13 and outputted alternately at predetermined intervals (for example, every 1/60 seconds) to the display unit 14. Then, the viewer 16 uses the shutter spectacles 15 to sense stereoscopic images of the object A from the images alternately displayed on the display unit 14.

If an optical axis of each of the zoom lenses 20 of the camera units 18a and 189b is correctly oriented, a reference beam $l_1$ emitted from the light source 24 is reflected by the first beam splitter 22, passed through the zoom lens 20 and reflected by the second beam splitter 23 to reach a correct point on the light receiving element 25. Since the reference beam $l_1$ is totally reflected by the first beam splitter 22, the reference beam never influences the image pickup element 21. Since the incidental point of the reference beam $l_1$ on the light receiving face of the light receiving elements 25 such as a PSD is not changed, due to no deviation, the optical axis deviation operating units 28a and 28b judge that there is no deviation in the optical axes of the zoom lenses 20 so that the moving mechanisms 2a and 2b for correcting the optical axes of the camera units 18a and 18b are not driven.

While the camera units 18a and 18b are photographing the object A, a lens controller (not shown) may be used to change the zoom lenses 20 from wide angle positions to zooming positions, or a universal head controller (not shown) may be controlled to change observing angles. At such a moment, the optical axis of, for example, the zoom lens 20 of the camera unit 18a may deviate from its correct path. Then, the reference beam $l_1$ emitted from the light source 24 is affected by the deviation when the reference beam reflected by the first beam splitter 22 passes through the zoom lens 20. Namely, if the optical axis of the zoom lens 20 deviates from its correct path, the outside light beam $l_2$ from the object A is also deviated from its correct path in forming an image on the image pickup element 21.

Therefore, the reference beam $l_1$ running from the image pickup element 21 toward the object A also deviates from the correct path and then enters the light receiving face of the light receiving element 25. The light receiving element 25 quantitatively reads coordinates of the incidental reference beam and direction of the deviation. Then, the light receiving element 25 outputs a detective signal 27a to the optical axis deviation operating unit 28a.

On the other hand, a light receiving element (not shown) of the camera unit 18b whose optical axis is not deviating from its correct path provides a detective signal 27b of no deviation to the optical axis deviation operating unit 28b.

The optical axis deviation operating apparatuses 28a and 28b receive the detective signals 27a and 27b, and generates deviations based on reference positions (where no deviation occurs on the optical axes of the zoom lenses 3) to output resultant signals 29a and 29b to the relative deviation operating unit 30.

Based on the deviation signals 29a and 29b, the relative deviation operating unit 30 generates a relative deviation of the reference beam $l_1$ that have been made incident to the light receiving faces of the light receiving elements 25 of the camera units 18a and 18b. Namely, a relative deviation of the optical axes of the zoom lenses 20 is calculated. A result of the operation is outputted to the correction signal generator 32.

According to the relative deviation signal 31, the correction signal generator 32 outputs correction signals 33a and 33b to the moving mechanisms 2a and 2b of the camera units 18a and 18b.

At this time, a zoom lens (not shown) of the camera unit 18b has no deviation in its optical axis. Namely, the incidental position of the reference beam to the light receiving element has no deviation from the correct position. Therefore, the optical axis deviation operating system 28b determines that the optical axis of the zoom lens (not shown) of the camera unit 18b has no deviation from the correct position. As a result, the correction signal generator 32 outputs the correction signal 33b of zero correction to the moving mechanism 2b to not drive the moving mechanism 2b.

On the other hand, the moving mechanism 2b is driven according to the correction signal 33a to correct the optical axis of the zoom lens 20 that moves integrally with the camera unit 18a.

In this way, while the camera units 18a and 18b are photographing the object A, deviation, if any, of the optical axes of the zoom lenses 20 from their correct paths are automatically corrected so that the viewer 16 can always sense proper stereoscopic images.

When the stereoscopic television system of the second embodiment is employed to remotely control a manipulator placed under severe environment, deviations, if any, of the optical axes of the zoom lenses 20 of the camera units 18a and 18b from their correct paths are automatically corrected so that the viewer can always sense proper stereoscopic images of an object. As a result, the safety of work and the operability of the manipulator are improved.

The first and second beam splitters 22 and 23, light source 24 and light receiving element 25 constitute means for detecting the deviation of an optical axis of each zoom lens 20 and are integrally disposed with the zoom lens 20 and image pickup element 21 in the camera units so that the system of the second embodiment can provide secure weather resistance against severe environment.

Although the second embodiment has been explained for the case in which optical axis deviation has occurred on the zoom lens 20 of the camera unit 18a, the embodiment can correct deviations occurring on optical axes of both the zoom lenses 20 of the camera units 18a and 18b.

In the second embodiment, the light source 24 is disposed on the side face of the first beam splitter 22. This light source may be disposed outside the system to emit light, which is guided by an optical fiber to the first beam splitter 22.

When optical axis deviations occur on the zoom lenses 20 of the second embodiment, the correction signal generator 32 outputs the correction signals 33a and 33b to drive the moving mechanisms 2a and 2b to mechanically correct the optical axis deviations. The correction signals 33a and 33b may be used to electrically move images displayed on the display unit 14 to compensate the optical axis deviations.

The second embodiment can automatically correct deviations of optical axes of optical systems of camera units due to operation of the zoom lenses or change of observing angles of an object. Therefore, good images are displayed on a display unit so that a viewer can always sense proper stereoscopic images.

Figure 5:
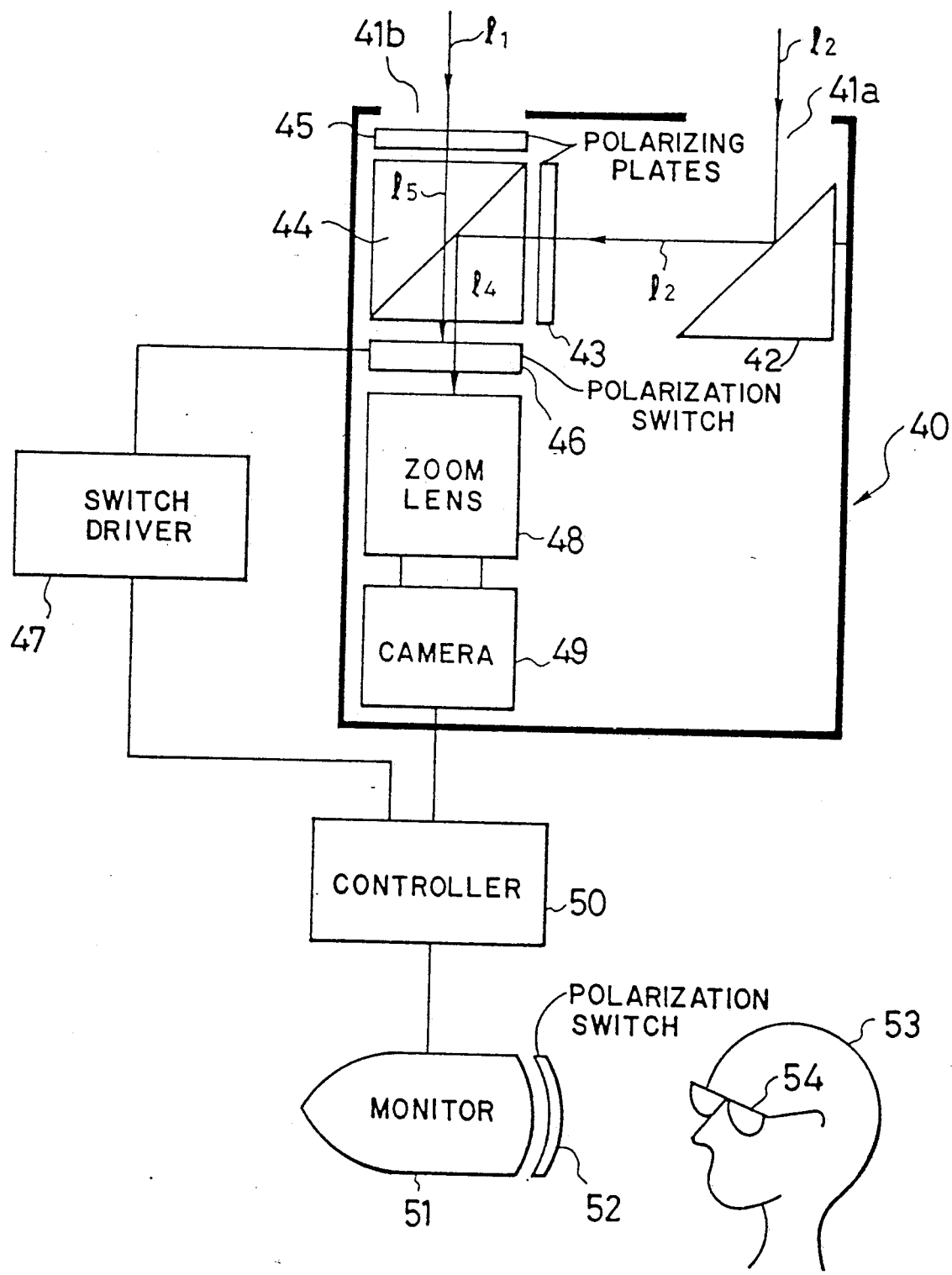
FIG. 5 is a schematic view showing a stereoscopic television system according to a third embodiment of the invention.

FIG. 5 shows a stereoscopic television system according to the third embodiment of the invention.

As shown in the figure, the stereoscopic television system of the third embodiment comprises a camera unit 40. In front of the camera unit 40, there is an object A that provides a right image beam $1_2$ and a left image beam $1_1$. The image light beams are made incident to right and left incident slits 41a and 41b, respectively. The slits are formed on the front face of the camera unit 40.

Facing the right incident slit 41a, there is a reflector 42 to reflect the right image beam $1_2$. The right image beam $1_2$ reflected by the reflector 42 reaches an S-type polarizing plate 43. The beam passed through the S-type polarizing plate 43 becomes an S-type polarized beam $1_4$ that is made incident to a beam splitter 44.

Facing the left incident slit 41b, a First-type polarizing plate 45 is arranged. The left light beam passes through the First-type polarizing plate 45 to become a First-type polarized beam $1_5$, which is made incident to the beam splitter 44. Due to the beam splitter 44, the polarized beams $1_4$ and $1_5$ that have passed through the Second-type and First-type polarizing plates 43 and 45 follow a common optical axis.

The left and right polarized beams $1_4$ and $1_5$ from the beam splitter 44 are made incident to a polarization switch 46. The polarization switch 46 is driven by a polarization switch driver 47 such that the Second-type and First-type polarized beams are alternately passed through the switch 46.

The Second-type and First-type polarized beams alternately switched by the polarization switch 46 are passed through a zoom lens 48 to form images on a television camera 49. Therefore, on the television camera 49, right images and left images are alternately displayed according to the operation of the switch 46.

Switching timing of the polarization switch 46 is controlled by the polarization switch driver 47 that is controlled by a controller 50 such that the timing is synchronized with a field rate of the television camera 49. The television camera 49 transmits video signals of images for left and right eyes alternately for every frame.

The video signals from the television camera 49 are sent to the controller 50, in which frequencies of the signals are up-converted. Then, the signals are sent to a monitor television unit 51 to display images. The images displayed on the monitor television unit 51 are polarized by a polarization switch 52 disposed in front of the monitor television unit 51. A viewer 53 wears polarizing spectacles 54 to see left and right images with corresponding eyes to sense stereoscopic images.

According to this stereoscopic television system, the right image beam $1_2$ and the left image beam $1_1$ are passed through the polarizing plates 43 and 45, beam splitter 44 and polarization switch 46, and made incident to the signal zoom lens 48. Therefore, compared to those cases of employing a plurality of optical systems such as zoom lenses, optical axis deviation due to zooming operation never occurs and, therefore, the displayed images never deviate from their correct positions in the third embodiment. As a result, good images are displayed and a view can always sense proper stereoscopic images.

Figure 6:
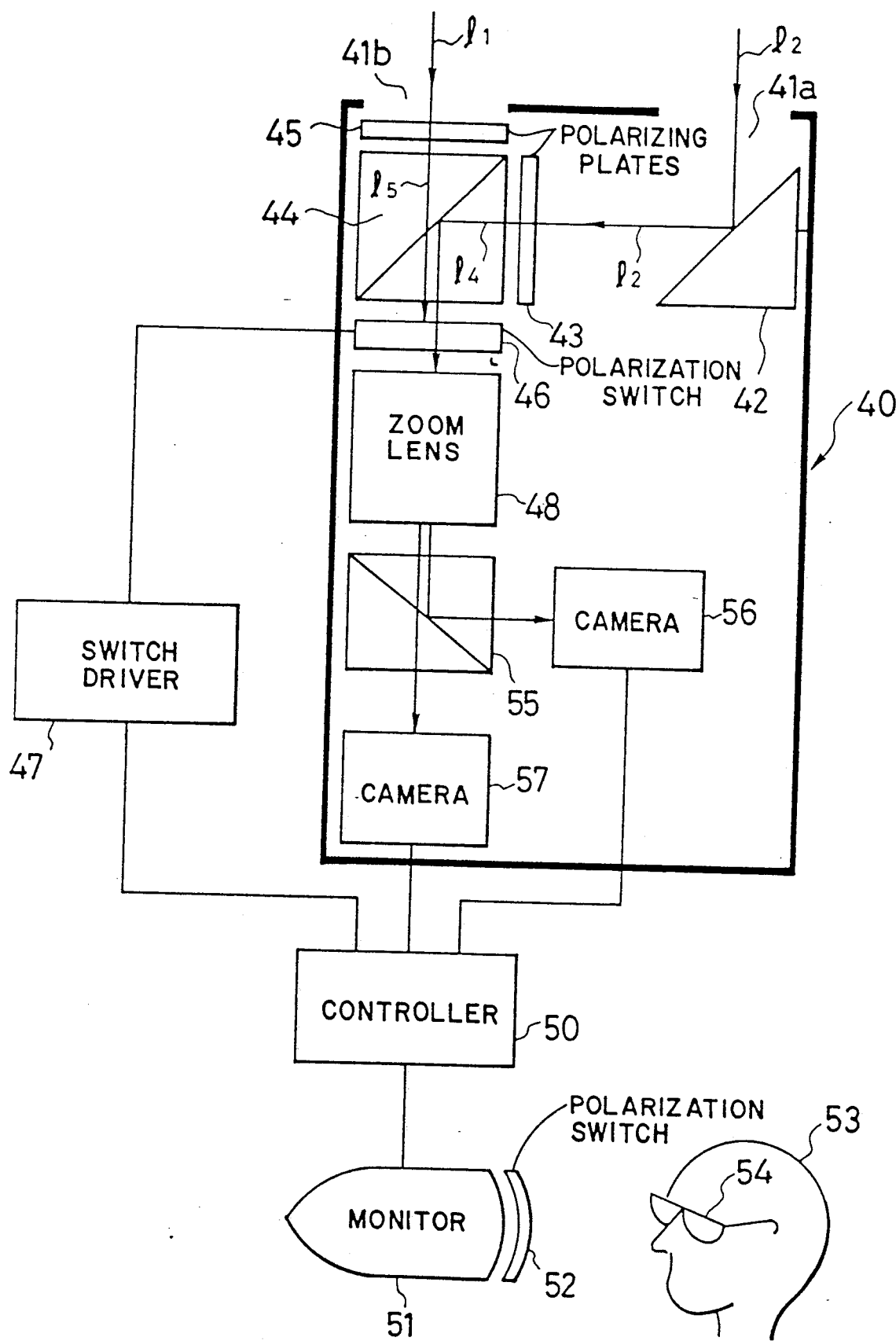
FIG. 6 is a schematic view showing a modification of the embodiment shown in FIG. 5.

FIG. 6 shows a stereoscopic television system according to a modification of the third embodiment of the invention.

The modification has the same arrangement as the third embodiment from the object A to the Zoom lens 48.

The First-type polarized beam and Second-type polarized beam from the zoom lens 48 are divided into First-type and Second-type beams by a polarizing beam splitter 55, and the beams are made incident to two video cameras 56 and 57, respectively. Video signals from the two video cameras 56 and 57 are passed through a controller 50 and alternately outputted to a monitor television unit 51 at predetermine intervals, i.e., at switching timing of the polarization switch 46. Images displayed on the monitor television unit 51 are polarized by a polarization switch 52 disposed in front of the monitor television unit 51. A viewer 53 wears polarizing spectacles 54 to see left and right images with his corresponding eyes to sense stereoscopic images.

As described in the above, according to the third embodiment of the invention, right image beams and left image beams are made incident to a signal optical system such as a zoom lens and processed so that optical axis deviation due to zooming operation of the optical system never occurs, thus always providing proper stereoscopic images.

Various modifications will become possible for those skilled in the art after receiving the teachings of the present disclosure without departing from the scope thereof.

What is claimed is:

1. A stereoscopic television system having first and second openings through which light rays reflected from an object to be viewed enter, said system comprising:

a first polarizer polarizing light rays passing through said first opening;

a second polarizer polarizing lightly rays passing through said second opening, polarization planes of said first and second polarizers being different from each other;

an optical means for aligning center axes of said light rays passing through said first and second openings to generate aligned light rays;

a polarizer switch receiving said aligned light rays and selectively and alternately passing light rays polarized by one of said first and second polarizers;

a zoom lens optically treating said aligned light rays for zoom operation;

a video camera converting optical images of light rays passing through said polarizer switch and said zoom lens into electrical signals corresponding to said light rays passing through said first and second openings; and a television system displaying an image of said object based on said electrical signals.

2. A system as claimed in claim 1, further comprising:

a controller controlling said polarizer switch and said television system such that scanning fields corresponding to light rays passing through said first and second openings are alternately generated in scanning fields of said television system; and a third polarizer, provided in front of a display of said television system, polarizing light rays emitted from scanning fields corresponding to light rays passing through said first and second openings in different polarization plates.

3. A stereoscopic television system having first and second openings through which light rays reflected from an object to be viewed enter, said system comprising:

a first polarizer polarizing light rays passing through said first opening;

a second polarizer polarizing light rays passing through said second opening, polarization planes of said first and second polarizers being different from each other;

an optical means for aligning center axes of light rays passing through said first and second openings to generate aligned light rays;

a polarizer switch receiving said aligned light rays and selectively and alternately passing light rays polarized by one of said first and second polarizers;

a zoom lens optically treating said aligned light rays for zoom operation;

a polarizing beam splitter separating light rays passing through said first and second openings after passage through said polarizer switch and said zoom lens;

a first video camera converting optical images of separated light rays corresponding to said light rays passing through said first opening into electrical signals;

a second video camera converting optical images of separated light rays corresponding to said light rays passing through said second opening into electrical signals; and a television system displaying an image of said object based on said electrical signals.

* * * * *